United States Patent Office 3,669,656
Patented June 13, 1972

3,669,656
TUNGSTEN BASE WELDING ROD, METHOD FOR MAKING SAME AND NOVEL APPLICATIONS OF SAME
Peter C. Murphy and J. Richard Lawrence, Indianapolis, Ind., assignors to P. R. Mallory & Co. Inc., Indianapolis, Ind.
No Drawing. Filed May 11, 1970, Ser. No. 36,489
Int. Cl. C22c 27/00
U.S. Cl. 75—176                              2 Claims

ABSTRACT OF THE DISCLOSURE

Tungsten base weld rod alloy contains 40 to 80% by weight tungsten; 5 to 40% nickel and 1 to 25% iron.

---

This invention relates to a new and unique composition for weld rod and a method of welding and repairing shaping members such as die casting dies and die components made of refractory materials or steel.

In recent years the development of refractory metal including tungsten and molybdenum base alloys for shaping members including dies and die components such as core pins has been recognized in the die casting industry. The much greater life of such shaping members as compared to similar products made of steel has been the controlling factor in the development in the die casting industry of interest in this product. Tungsten base compositions for shaping members are disclosed and claimed in application Serial Nos. 855,701 and 855,712, filed Sept. 5, 1969, assigned to the same assignee as the present application, which applications are hereby expressly incorporated into the present application by reference and made a part hereof.

However, one problem which has been encountered in the use of refractory materials for shaping members is that when small defects occur in the shaping members such as eroded portions, machining errors, fatigue cracks and other defects, there has been no available technique to cure these defects, rendering the shaping members suitable for still longer life.

Also, it is sometimes desirable to effect design changes in the shaping members by simple means such as welding used on refractory shaping members and on hot work die steels.

It is therefore an object of the present invention to provide a welding rod composition for welding refractory base materials and die steels.

It is another object of the present invention to provide a method for obtaining greater life of die casting shaping members and for obtaining greater flexibility in the use of such shaping members.

It is another object of the present invention to provide a method of making a welding alloy suitable for welding shaping members.

It is another object of the present invention to provide a novel welded structure.

Other objects will be apparent from the following description.

In accordance with the present invention it has been found that a tungsten base alloy comprising 40 to 80% tungsten, 5 to 40% nickel and about 1 to 25% iron can successfully be welded to refractory materials and to die steels.

Preferably, the alloy contains about 50 to about 70% tungsten, about 20 to about 30% nickel, and about 10 to about 15% iron.

Furthermore, additional weld strength can be obtained by adding one or more of the following elements in an amount per element up to about 5% by weight of the composition; cobalt, copper, chromium, titanium, tantalum, rhenium, vanadium and molybdenum. The total amount of such additives should not be greater than about 10% or the welded structure may be too brittle.

Exemplary molybdenum base alloys include cast or sintered molybdenum, solid solution alloys of tungsten and molybdenum and molybdenum alloys containing minor alloying additives such as titanium, columbium, vanadium, and zirconium up to about 2% and carbon up to about 0.2%.

Shaping members are also often made of die steels. For example C, .3–.5; Cr; Mo, V, Co, up to 5%; Mn, up to 1%; Si, up to 1.3%.

As is disclosed in the said Ser. No. 855,701, addibase alloys which are particularly suitable for shaping members may comprise about 1 to 12% nickel and 0.5 to about 8 weight percent iron. The shaping members may include die casting dies, molds, cores, core pins and related die structure.

As is disclosed in the said Ser. No. 855,701, additional shaping member composition comprises a tungsten base alloy containing about 1 to 12% nickel, about 0.5 to 8% iron and about 0.5 to 8% molybdenum. The addition of molybdenum provides greater strength and resistance to thermal shock.

The said application Ser. Nos. 855,701 and 855,712 disclose room temperature and elevated temperature properties of the tungsten base shaping members as well as the excellent resistance to thermal fatigue which these materials possess.

In general the welds utilizing the welding alloy of the present invention whether made to tungsten base materials, molybdenum base materials or die steels, will have a room temperature ultimate tensile strength of at least about 100,000 p.s.i., a 2% offset yield strength of about 90,000 p.s.i., a proportional limit of at least about 50,000 p.s.i. and elongation in one inch of at least about 1%.

Preferably, a tensile strength of 115,00 p.s.i., a 2% yield strength of 100,000 p.s.i. and a proportional limit of 60,000 p.s.i. is obtained. The preferred elongation is at least about 2% in one inch.

Insofar as elevated temperature properties are concerned, the welds will have a short time ultimate tensile strength at 1200° F. of at least about 75,000 p.s.i. and an elongation in one inch of about 2%. At 2,000° F. an ultimate tensile strength of at least about 20,000 p.s.i. is generally obtained, preferably at least about 24,000 p.s.i. and an elongation in one inch of at least about 3%, preferably about 4%.

It will be apparent to those skilled in the art, that these properties are more than adequate to withstand the stresses and thermal cycling normally encountered in the use of shaping members in die casting and related applications.

According to another embodiment of the present invention, it has been found that the welding alloy of the present invention can be used to apply an overlay upon steel die casting components for example having the previously described steel compositions. The coating is applied by arc welding and preferably is from about two-thousandths of an inch to one-eighth of an inch thick. It is unexpected that such an overlay would function satisfactorily because of the large difference in coefficient of thermal expansion of die steel as compared to the alloy of the present invention. However, it is believed that the sound metallurgical bond formed between the alloy overlay and the steel may at least in part account for the satisfactory castings and die life obtained.

The welding alloy of the present invention can be made in the following manner. Elemental powders of metallic tungsten, nickel and iron of a size less than about 10 microns, preferably from 1 to 8 microns are mixed together with a suitable organic binder or mixture of binders, for example paraffin in an exemplary amount of 3 to 15% by weight. Alternatively co-reduced powders of these metals may be used, in a size below 10 microns.

Upon affecting the mixing there next follows a pressing operation. This can be done hydraulically or hydrostatically, or extrusion may be utilized. In general a pressure range of from about 1 to 50 tons per square inch may be used.

Of course, if hydrostatic pressing is utilized it is not necessary to use any binder in the initial powder mix. Dies are used in the pressing operation corresponding to the shape of weld rod desired, but considerably enlarged to allow for shrinkage during pre-sintering and sintering. As a result of the pressing operation a green compact is obtained which has sufficient strength for the pre-sintering step.

During the pre-sintering green compacts are placed on boats for example made of carbon or ceramic and then heated. The pre-sintering temperature should be from 400° C. to 1200° C. for 15 to 75 minutes. During pre-sintering if the weld rod is of circular cross section form it may be placed in powdered refractory material or "V" groove slabs made for example of metal or ceramic material such as alumina. In general up to about 5% shrinkage is expected during pre-sintering.

The sintering temperature is very important and should be carried out at a temperature below 1485° C. to avoid melting the alloy. The time should be from 10 minutes to 24 hours and the temperature is preferably between 1430 and 1470° C. This will result in a product having about 85% of theoretical density minimum.

In order to obtain a higher density, the sintered alloy may be swaged with a reduction in area of 1 to 30%. Usually only one pass is necessary and this results in a product having above 90%, preferably 95%, of theoretical density.

Weld alloy material, preferably in rod form is readily utilized in conventional welding equipment. For example, a Linde HDA-300 welder may be used. As is conventional in welding, an arc is struck between the welding electrode, for example a tungsten electrode and the work piece, and the weld rod is fed into the arc, preferably at an acute angle with respect to the electrode. The arc melts the weld rod and a deposit is formed on the work piece as is well known to those skilled in the welding art.

Exemplary current to be used during welding may be between 375 amps to start and approximately 200 amps continuing. Preferably, the arc is struck between the electrode and the work piece prior to introducing the weld rod into the arc. The voltage across the arc may be for example 20-80 volts. Obviously, the particular welding currents and voltages may vary as desired. Likewise, the atmosphere may be varied by those skilled in the welding art. The process may be carried out in an inert gas such as argon, helium or nitrogen or vacuum chamber. However, if desired such a chamber may be dispensed with and the welding operation carried out in air.

The welds resulting from the above described procedures are sound, non-porous, consistant, and strong, and have the previously described mechanical properties. The technique requires only a normal degree of welding skill. Exhaustive metallurgical analysis has proven this fact. In addition, subsequent thermal fatigue tests show the welded structures to have life characteristics similar to the component or shaping base material in the die itself.

Resistance to thermal fatigue in die casting applications has proven to be excellent in that examination after 40,000 cycles in brass die casting has resulted in no defects due to thermal fatigue.

We claim:
1. Weld rod consisting essentially of 50 to 70% tungsten, about 20 to 30% nickel and about 10 to 15% iron, an additional element selected from the group consisting of cobalt, copper, chromium, titanium, rhenium, tantalum, molybdenum and vanadium being optionally present in an amount up to about 5% by weight per element.
2. Weld rod according to claim 1 in which the total additive content is up to about 10%.

References Cited
UNITED STATES PATENTS

| | | | |
|---|---|---|---|
| 1,110,303 | 9/1914 | Kreusler | 75—176 |
| 2,206,537 | 7/1940 | Price | 75—176 |
| 2,793,951 | 5/1957 | Green et al. | 75—176 X |
| 2,843,921 | 7/1958 | Ang | 75—176 X |
| 3,254,995 | 6/1966 | Goodfellow et al. | 75—176 |
| 2,977,225 | 3/1961 | Wlodek et al. | 75—176 |
| 3,188,204 | 6/1965 | Bishop et al. | 75—176 X |
| 3,307,982 | 3/1967 | Milligan et al. | 75—176 X |

FOREIGN PATENTS

| | | | |
|---|---|---|---|
| 12,684 | 1909 | Denmark | 75—176 |

OTHER REFERENCES

Tungsten—Physical Properties and Phase Diagrams, Sylvania Elec. Prod. Inc., 1959, pp. 38 and 39.
Nuclear Abstracts—No. 8754, May 15, 1960.
Nuclear Abstracts—No. 33953, vol. 23, No. 17.
Nuclear Abstracts—No. 43885, Dec. 15, 1966.

CHARLES N. LOVELL, Primary Examiner

U.S. Cl. X.R.
75—122; 148—32